United States Patent
Kawai

[11] Patent Number: 5,993,733
[45] Date of Patent: Nov. 30, 1999

[54] METHOD OF MANUFACTURING SINTERED SYNCHRONIZING RING

[75] Inventor: Satoshi Kawai, Chitose, Japan

[73] Assignee: Dynax Corporation, Hokkaido, Japan

[21] Appl. No.: 08/787,853

[22] Filed: Jan. 23, 1997

[51] Int. Cl.[6] .............................. B22F 3/12; B22F 7/02; B22F 7/04

[52] U.S. Cl. .................................. 419/48; 419/5; 419/6; 419/8; 419/10; 419/12

[58] Field of Search ................................ 419/5, 6, 8, 38, 419/48, 10, 12

[56] References Cited

U.S. PATENT DOCUMENTS 5,043,123  8/1991  Gormanns et al. ...................... 264/113
5,543,235  8/1996  Mirchandani et al. .................. 428/547

*Primary Examiner*—Daniel J. Jenkins
*Attorney, Agent, or Firm*—Duane, Morris & Heckscher LLP

[57] ABSTRACT

A synchronizing ring 10 having an annular structural part 11 and a frictional layer 12 is manufactured by filling a mold 20 with a material for the structural part or a material for the frictional layer and compacting the material filled in the mold 20, filling the mold with a material for the frictional layer or a material for the structural part and compacting the material filled into the mold to unify the structural part and the frictional layer, and sintering the unified structural part 11 and frictional layer 12 in a sintering furnace. The frictional layer 12 can be combined with the structural part 11 without forcibly mounting the frictional layer 12 on the structural part 11. The material for the frictional layer need not be presintered, and the frictional layer can be formed by a single sintering cycle.

14 Claims, 3 Drawing Sheets

METHOD OF MANUFACTURING SINTERED SYNCHRONIZING RING

FIELD OF INVENTION

The present invention relates to a method of manufacturing a synchronizing ring incorporated, for example, into an automotive transmission for synchronously rotating two speed gears to be engaged when changing the speed gears of the transmission so that the two speed gears are engaged smoothly.

BACKGROUND OF INVENTION

A synchronizing ring of such a kind has an annular structural part and a frictional layer. Some synchronizing rings have an annular structural part and a frictional layer formed on the inner circumference of the structural part, some synchronizing rings have an annular structural part and a frictional layer formed on the outer circumference of the structural part, and other synchronizing rings have an annular structural part and frictional layers formed on the outer and inner circumferences of the structural part, respectively. In any one of those synchronizing rings, the frictional layer is brought into frictional engagement with the tapered portions (conical portions) of the speed gears.

The frictional layer is provided in its working circumference to be in engagement with the tapered portion of the speed gear with a plurality of circumferential grooves of a trapezoidal cross section for cutting an oil film. Top lands are formed between the grooves in the frictional layer.

If the top lands are abraded, the area of contact between the frictional layer and the tapered portion increases and an oil film is liable to be formed. Consequently, such a synchronizing ring having abraded top lands needs much time for bringing the twospeed gears to the same rotating speed.

Therefore, in most cases, the frictional layer is formed of a highly abrasion-resistant, frictional metal easy to machine to form grooves therein, such as iron, aluminum bronze, and high-strength brass.

In most recent transmissions of a high output capacity, a high pressure is exerted on a synchronizing ring by the tapered portion of a speed gear. Therefore, the frictional layer of the synchronizing ring is abraded rapidly and hence, in some cases, the synchronizing ring is unable to withstand a long period of use. Frictional layers of high-strength brass are particularly rapidly abraded.

Some synchronizing rings have a structural part and a frictional layer formed of a material containing resin, metal or paper as a base material and bonded to the structural part.

All those synchronizing rings need to be fabricated by bonding a frictional layer to a structural part. Therefore, the manufacture of those synchronzing rings needs much manhours and high costs.

A method of manufacturing a synchronizing ring proposed to solve the foregoing problems is disclosed, for example, in Japanese Unexamined Patent Publication No. 223105/1988.

This previously proposed method of manufacturing a synchronzing ring comprises the following steps.

First, a self-holding molded ring, which serves as a frictional layer, is formed by compacting a mixture of a sintered powder and a bond or by presintering a sintered powder.

Secondly, the molded ring is pressed in a support ring (structural part) to form an assembly of the molded ring and the support ring.

Lastly, the assembly of the molded ring and the support ring is sintered to unify the molded ring and the support ring.

This method of manufacturing a synchronizing ring has the following problems.

(1) The method requires much time and labor and hence it is difficult to manufacture the synchronizing ring at a low cost because the method needs both the process for compacting a sintered powder and the process for pressing the molded ring in the support ring.

(2) The molded ring, i.e., the frictional layer, needs tube formed of metal so that the molded ring may not be broken by a pressure that is applied thereto when the molded ring is pressed in the support ring and the frictional properties and abrasion resistance of the metal must be sacrificed to strength. Consequently, the porosity of the frictional layer is reduced and the frictional layer is unable to secure a satisfactorily high frictional effect.

SUMMARY OF INVENTION

In order to solve the above problems and according to a first aspect of the present invention, a method of manufacturing a synchronizing ring comprising an annular structural part and a frictional layer formed on the annular structural part, comprises the steps of filling a mold with a material for the structural part (or a material for the frictional layer) and compacting the material filled in the mold, filling the mold with a material for the frictional layer (or a material for the structural part) and compacting the material filled into the mold to unify the structural part and the frictional layer, and simultaneously sintering the unified structural part and frictional layer.

Further, according to a second aspect of the present invention, a method of manufacturing a synchronizing ring comprising an annular structural part and a frictional layer formed on the annular structural part, comprises the steps of filling a mold with a material for the structural part and a material for the frictional layer, and simultaneously carrying out a molding process for molding the materials and a sintering process for sintering the molded materials by supplying a pulse current through the compacted materials.

The method according to the first aspect of the present invention manufactures a synchronizing ring by the following processes.

First, a material for the structural part (or a material for the frictional layer) is filled into a mold and the material filled in the mold is compacted, and then a material for the frictional layer (or a material for the structural part) is filled in the mold and the material filled into the mold is compacted to unify the structural part and the frictional layer mechanically in the mold. The frictional layer is formed integrally with the structural part on the inner or outer circumference of the latter. The structural part and frictional layer thus unified are taken out of the mold and then are sintered in a sintering furnace.

Then, the frictional layer is cut in a tapered shape (conical shape), and grooves are formed in the frictional layer. The grooves may be formed when compacting the material for the frictional layer in the mold.

Thus, the synchronizing ring is completed.

The method according to the second aspect of the present invention manufactures a synchronizing ring by the following processes.

First, a material for the structural part and a material for the frictional layer are filled in a sintering mold.

A pulse current is supplied through the structural part and the frictional layer while a pressure is applied to the structural part and the frictional layer to mold and sinter the materials simultaneously. Thus, the structural part and the frictional layer are unified. Thus, the structural part and the frictional layer are unified. The frictional layer is formed integrally with the structural part on the inner or outer circumference of the structural part.

Then, the frictional layer is cut in a tapered shape (conical shape), and grooves are formed in the frictional layer. The grooves may be formed when compacting the material for the frictional layer in the mold.

Thus, the synchronizing ring is completed.

The frictional layer of the synchronizing ring manufactured by the method according to the first or second aspect of the present invention is formed integrally with the structural part, and the frictional layer need not be pressed in the structural part. The material for the frictional layer is not presintered and the frictional layer is formed by a single sintering cycle.

PREFERRED EMBODIMENTS

Preferred embodiments of the present invention will be described hereinafter with reference to FIGS. 1 to 3.

Figure 3:
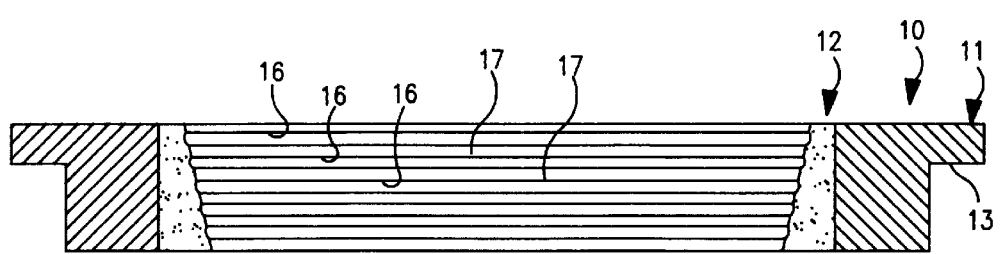
FIG. 3 is a sectional view of a synchronizing ring.

Referring to FIG. 3, a synchronizing ring 10 has an annular structural part 11 and a frictional layer 12 formed on the inner circumference of the structural part 11. The structural part 11 and the frictional layer 12 are formed of materials capable of being sintered, respectively.

Suitable materials for forming the structural part 11 are, for example, a powder of an iron base alloy containing carbon, molybdenum, copper, nickel, and chromium, and a powder of a copper base alloy containing zinc, tin, aluminum, manganese and iron.

Suitable materials for forming the frictional layer 12 are, for example, powders capable of being sintered, such as, carbon powders, metal powders and resin powders, and fibers capable of being sintered, such as, carbon fibers.

Figure 1A:
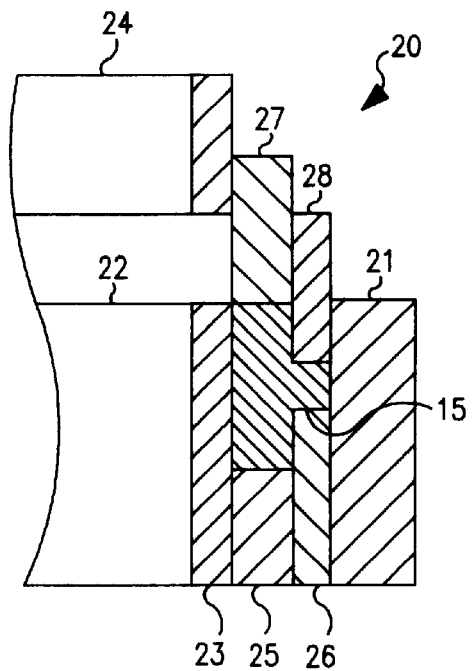
FIG. 1 is a schematic sectional views of assistance in explaining a manufacturing method in a first embodiment according to the present invention.
Figure 1B:
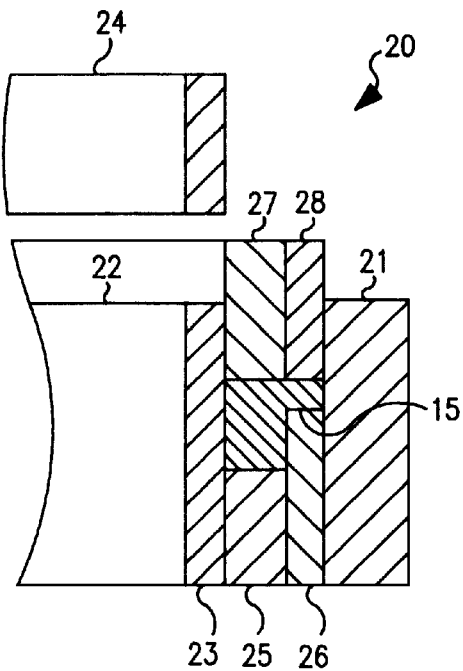
Figure 1C:
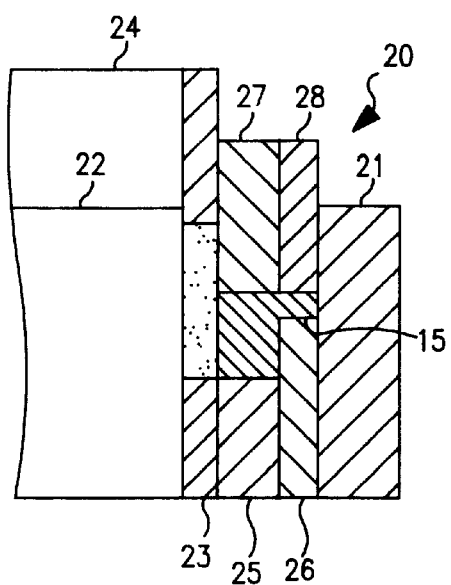
Figure 1D:
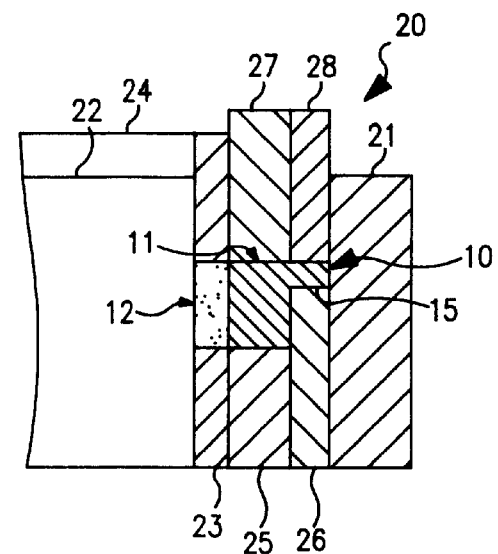
Figure 2:
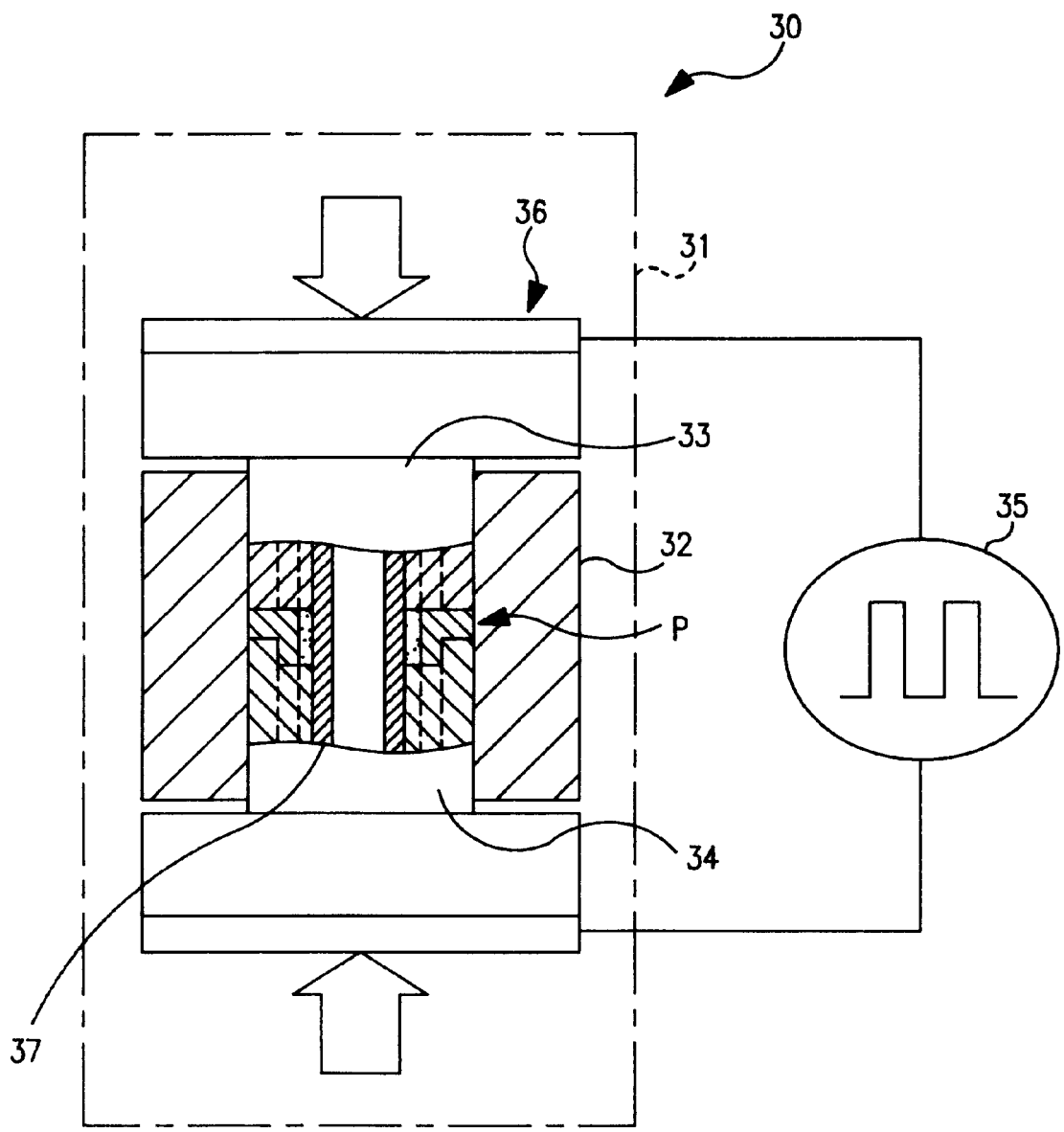
FIG. 2 is a schematic sectional view of a discharge plasma sintering apparatus.

The synchronizing ring 10 is manufactured by a manufacturing method which carries out a molding process and a sintering process individually (FIG. 1) or a manufacturing method which carries out a molding process and a sintering process simultaneously by a discharge plasma sintering apparatus 30 (FIG. 2).

A method of manufacturing a synchronizing ring 10 in a first embodiment according to the present invention will be described with reference to FIG. 1. This method carries out a molding process and a sintering process individually.

A mold 20 employed in this method comprises an annular die 21, a cylindrical core 22, an annular lower punch 23 for forming a frictional layer, disposed between the die 21 and the core 22, an annular upper punch 24 disposed opposite to the lower punch 23, a smaller annular lower punch 25 for forming a structural part, mounted on the die 21, a larger annular lower punch 26 for forming a structural part, mounted on the die 21, a smaller upper punch 27 disposed opposite to the smaller lower punch 25, and a larger upper punch 28 disposed opposite to the larger lower punch 26.

The larger lower punch 26 and the larger upper punch 28 are used for molding a flange 13 of the structural part 11. The larger lower punch 26 is disposed with its upper end on a level above the upper end of the smaller lower punch 25.

The synchronizing ring 10 is manufactured by the following steps.

At a stage between molding, the lower punch 23 for molding a frictional layer is disposed with its upper and substantially flush with the upper end of the core 22 [FIG. 1A].

A material for the structural part 11 is filled into a space defined by the lower punches 25 and 26 and the upper punches 27 and 28.

The larger upper punch 28 and the smaller upper punch 27 are lowered to compress the material for the structural part 11 between the upper punches 28 and 27 and the lower punches 25 and 26 for compacting to form the self-holding structural part 11 [FIG. 1B]. At the same time, splines 15 may be formed in the flange 13. The splines 15 are chamfered, not shown.

If a portion of the material filled in a space between the larger lower punch 26 and the larger upper punch 28 is compacted (compressed) in a density higher than that of a portion of the material compacted between the smaller lower punch 25 and the smaller upper punch 27, the flange 13 of the synchronizing ring 10 (FIG. 3) has an enhanced rigidity. Usually, the flange 13 is provided with the splines 15 with which a sleeve not shown, i.e., one of the component parts of a transmission, engages. Therefore, it is desirable that the flange 13 has a relatively high rigidity. Those two portions may be formed of materials of different kinds (different compositions), respectively, for the same purpose.

Subsequently, the lower punch 28 for forming a frictional layer is lower to form a space between the core 22 and the structural part 11, and a material for the frictional layer 12 is filled in the same space.

Then, the upper punch for forming a frictional layer is lowered to compress the material for the frictional layer 12 between the upper punch 24 and the lower punch 23 to mold the self-holding frictional layer 12 [FIGS. 1C, 1D]. The structural part 11 and the frictional layer 12 are unified mechanically by the pressure applied to the material by the upper punch 24.

Then, the structural part 11 and the frictional layer 12 thus mechanically unified are taken out of the mold 20, placed in a sintering furnace, and are sintered. When the structural part 11 and the frictional layer 12 are sintered, the materials forming the structural part 11 and the frictional layer 12 are converted into dense, firm solids, particles and molecules of the materials disperse across the interface between the structural part 11 and the frictional layer 12, whereby the structural part 11 and the frictional layer 12 are closely and firmly unified.

Preferably, the materials to be sintered contain a binder to form compacted parts having a sufficient strength, and the core is treated with a mold lubricant to ensure the satisfactory joint of the materials by sintering and to stabilize the dimensions and density.

Then, the inner circumference of the frictional layer 12 (FIG. 3) is machined in a tapered shape (conical shape), and grooves 16 are formed in the inner circumference of the frictional layer 12. Top lands 17 are formed between the grooves 16.

Thus, the synchronizing ring 10 is completed.

Although the foregoing method in the first embodiment fills the material for the structural part in the mold and compacts the same, and then fills the material for the frictional layer in the mold and compacts the same, the material for the frictional layer may be filled in the mold and compacted first, and then the material for the structural part may be filled in the mold and compacted.

A method of manufacturing a synchronizing ring 10, in a second embodiment according to the present invention using a discharge plasma sintering apparatus 30 will be described with reference to FIG. 2. This method carries out a molding process and a sintering process simultaneously.

Referring to FIG. 2 typically showing the discharge plasma sintering apparatus 30, a sintering mold 36 comprises a guide 32 disposed in a vacuum chamber 31, and an upper punch 33 and a lower punch 34, which are guided for vertical movement by the guide 32. A core 37 is extended through the upper punch 33 and the lower punch 34. The sintering mold 36 is designed taking into consideration the finished shape and dimensions of a product P at an ordinary temperature.

The upper punch 33 and the lower punch 34 are connected to a power source 35, which supplies a pulse current.

Materials to be sintered are filled into a space between the upper punch 33 and the lower punch 34, and the upper punch 33 and the lower punch 34 compress the materials.

A pulse current is supplied through the upper punch 33 and the lower punch 34 for molding and sintering by a plasma the materials that have been compressed.

The discharge plasma sintering apparatus is capable of sintering the materials at a low temperature in a short time, of more closely and firmly joining together the boundary portions of the structural part and the frictional layer and of forming the structural part and the frictional layer having chamfered portions and keyways in a desired shape and strength without requiring any forging process and any post treatment, such as a heat treatment.

When using the discharge plasma sintering apparatus, the mold employed in the first embodiment may be employed and disposed as indicated by alternate long and two short dashes lines in FIG. 2. In this case, the material for the structural part and that for the frictional layer can be compacted in different densities, respectively. Some parts of the mold may be replaced with other parts.

If the method using the discharge plasma sintering apparatus 30 processes metallic materials, the sintering process is carried out in a reducing atmosphere or in a vacuum (an evacuated atmosphere) to prevent the oxidation of the metallic materials.

If the frictional layer is formed by bonding organic carbon with a resin binder, the initial stage of sintering is carried out under a pressure or the atmospheric pressure to suppress the sudden generation of gases.

Either the method described with reference to FIG. 1 which carries out a molding process and a sintering process individually or the method described with reference to FIG. 2 which uses the discharge plasma sintering apparatus 30 and carries out a molding process and a sintering process simultaneously unifies the structural part 11 and the frictional layer 12 without requiring a process to press the frictional layer 12 in the structural part 11. The material for the frictional layer 12 need not be presintered, and the frictional layer 12 can be formed by a single sintering cycle.

Although the structural part of the foregoing synchronizing ring is provided with the frictional layer on its inner circumference, the structural part may be provided with a frictional layer on its outer circumference or may be provided with frictional layers on both the inner and outer circumferences thereof. Synchronizing rings of those structures can be manufactured by methods similar to those described herein.

A mold, not shown, suitable for manufacturing a synchronizing ring having a structural part and a frictional layer formed on the outer circumference of the structural part has a structure constructed by disposing a set of punches corresponding to the set of punches 28 and 26 of FIG. 1 and a set of punches corresponding to the frictional layer forming punches 24 and 28 of FIG. 1 in a diameter greater than that of the set of punches corresponding to the set of punches 28 and 36.

A mold, not shown, suitable for manufacturing a synchronizing ring having a structural part and frictional layers formed on the inner and outer circumferences of the structural part has a structure constructed by disposing acts of frictional layer forming punches on the inner side and outer side of the set of punches 24 and 25 of FIG. 1, respectively.

Although the material for the frictional layer, as a rule, is a powder, the material may be a preformed ring, a flexible sheet or a material containing paper or nonwoven fabric of fibers as a base, provided that the material is capable of being sintered.

Advantages of Invention

The manufacturing methods stated in claims 1 and 2, which unify the frictional layer and the structural part without requiring a process of pressing the frictional layer in the structural part, have the following advantages.

(1) A process for compacting a sintered powder and a process for pressing, which are necessary for conventional methods, are unnecessary and hence the number of processes can be reduced.

(2) The frictional layer may be formed of a material having a high porosity other than metals, and hence the frictional layer having a desired frictional effect can be formed.

The method stated in claim 2 in particular, carries out a molding process and a sintering process simultaneously by discharge plasma sintering and hence has the following advantages a in addition to those mentioned above.

(1) No mold specially for molding is necessary.

(2) Sintering can be accomplished at a low temperature in a short time.

(3) The structural part and the frictional layer can more firmly be unified.

What is claimed is:

1. A method of manufacturing a synchronizing ring comprising an annular structural part and a frictional layer formed on the annular structural part, said method comprising the steps of:

filling a mold with a material for the structural part and a material for the frictional layer; and, simultaneously carrying out a molding process for molding the materials and a sintering process for sintering the materials by supplying a pulse current through the materials while compacting the materials to form compacted materials therefrom.

2. A method of manufacturing a synchronizing ring according to claim 1, wherein at least one of a density and a quality of the compacted material for the structural part is varied according to radial positions in the structural part.

3. A method of manufacturing a synchronizing ring according to claim 1 wherein the material for the structural part is an iron base alloy powder.

4. A method of manufacturing a synchronizing ring according to claim 2 wherein the material for the structural part is an iron base alloy powder.

5. A method of manufacturing a synchronizing ring according to claim 1, wherein the material for the structural part is a copper base alloy powder.

6. A method of manufacturing a synchronizing ring according to claim 2, wherein the material for the structural part is a copper base alloy powder.

7. A method of manufacturing a synchronizing ring according to claim 1, wherein the material for the frictional layer is a powder capable of being sintered.

8. A method of manufacturing a synchronizing ring according to claim 2, wherein the material for the frictional layer is a powder capable of being sintered.

9. A method of manufacturing a synchronizing ring according to claim 1, wherein the material for the frictional layer is fibers capable of being sintered.

10. A method of manufacturing a synchronizing ring according to claim 2, wherein the material for the frictional layer comprises fibers capable of being sintered.

11. A method of manufacturing a synchronizing ring according to claim 7, wherein the material for the frictional layer comprises a powder of at least one of carbon, metal and resin.

12. A method of manufacturing a synchronizing ring according to claim 8, wherein the material for the frictional layer comprises a powder of at least one of carbon, metal and resin.

13. A method of manufacturing a synchronizing ring according to claim 9, wherein the material for the frictional layer comprises fibers capable of being sintered.

14. A method of manufacturing a synchronizing ring according to claim 13, wherein the material for the frictional layer comprises carbon fibers.

* * * * *